(12) United States Patent
Tendler

(10) Patent No.: US 8,172,393 B2
(45) Date of Patent: *May 8, 2012

(54) METHOD AND APPARATUS FOR VIEWING POLARIZED DISPLAYS

(76) Inventor: Robert K. Tendler, Chestnut Hill, MA (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/148,105

(22) Filed: Apr. 16, 2008

(65) Prior Publication Data

US 2009/0303428 A1    Dec. 10, 2009

Related U.S. Application Data

(62) Division of application No. 11/220,318, filed on Sep. 6, 2005, now Pat. No. 7,374,282.

(51) Int. Cl.
*G02C 7/12*    (2006.01)
(52) U.S. Cl. .......................... 351/49; 351/45
(58) Field of Classification Search ............... 351/49, 351/45, 46, 44, 41, 163, 165, 159
See application file for complete search history.

(56) References Cited

U.S. PATENT DOCUMENTS

| | | | | |
|---|---|---|---|---|
| 2,334,446 A * | 11/1943 | Serrell | ........................... | 351/49 |
| 6,623,116 B2 * | 9/2003 | Kerns, Jr. et al. | .............. | 351/165 |
| 7,374,282 B2 * | 5/2008 | Tendler | ........................... | 351/49 |
| 7,506,976 B2 * | 3/2009 | Baiocchi et al. | ................ | 351/49 |
| 2004/0046927 A1 * | 3/2004 | Montgomery | .................. | 351/46 |

* cited by examiner

*Primary Examiner* — Hung Dang
(74) *Attorney, Agent, or Firm* — Robert K. Tendler

(57) ABSTRACT

A pair of sunglasses is provided with a polarized region in the upper portion of the eyeglass lens and a non-polarized region in the bottom portion of the eyeglass lens so as to permit reading of polarized instruments through the non-polarized region. The two regions may be separated horizontally at the halfway point or below the halfway point such that, by tilting one's head upwardly and looking through the non-polarized region, one can readily read the instruments which would appear black through the polarized region due to the cross-polarization. In one embodiment the polarization level is gradually decreased from the top to the bottom of the lens in a polarization gradient in which there is no polarization at the bottom portion of the lens.

12 Claims, 6 Drawing Sheets cross-polarization

METHOD AND APPARATUS FOR VIEWING POLARIZED DISPLAYS

CROSS REFERENCE TO RELATED APPLICATION

This Application is a division of application Ser. No. 11/220,318 filed Sep. 6, 2005, now U.S. Pat. No. 7,374,282, the contents of which are incorporated herein by reference.

FIELD OF THE INVENTION

This invention relates to polarized eyeglasses and more particularly to a method and apparatus for viewing instrumentation that has a polarized display.

BACKGROUND OF THE INVENTION

Polarized sunglasses have been available for many years in which polarized lenses have been used to filter out reflections and in general to sharpen the viewed images of the surrounding scene. The polarization not only provides glare protection but also in some cases attenuates the overall light level such that the polarized glasses function not only as polarization lenses but also as light attenuating lenses.

The problem with such sunglasses is that in the newer instruments, such as cockpit dashboard-mounted instrumentation, there is a polarization layer over the display which is meant to enhance the display and cut down the effect of reflected light so that the display may be readily visible. This is true for aircraft cockpit instrumentation as well as, for instance, for instrumentation that is viewed outdoors, such as marine instrumentation, namely knotmeters, anemometers, wind direction and navigation instrumentation.

Moreover, in some automotive installations, the instrumentation is likewise provided with a polarized layer so as to make the display readily viewable in all light conditions. However, when one decides to view this instrumentation while using polarized sunglasses, the instrumentation appears black due to the cross-polarization in which no light comes through the sunglasses from the instrumentation itself. The result is that, in order to view the polarized displays, one must remove one's sunglasses, which is inconvenient at best and sometimes dangerous when, for instance, one is using the polarized sunglasses to view a scene and must switch one's gaze from the scene to the instrumentation, as in cases of emergency.

The result is that one uses non-polarized sunglasses, as do pilots, and therefore one does not attain the benefit of polarized sunglasses, which are substantially better at more sharply defining the viewed scene than are the non-polarized sunglasses. While these sunglasses do attenuate glare in various regions of the electromagnetic spectrum, they do not use the polarization component to effect such attenuations.

SUMMARY OF INVENTION

Rather than providing polarized sunglasses that are polarized over the entire extent of the sunglass lens, in the subject invention only a portion of the sunglass lens is polarized. In one embodiment the polarized portion is the upper portion of the sunglass lens corresponding to directly viewing a scene, whereas the lower portion of the sunglass lens is left unpolarized.

Whether the polarization is formed by an overlay of only the top portion of a regular sunglass lens or whether a polarization gradient going from maximum polarization to no polarization is utilized, it is the purpose of the subject invention to be able to read instrumentation through the lower portion of the sunglass lens by viewing it through the non-polarized portion of the lens, whereas to a view a scene, one views through the polarized portion of the polarized lens.

Thus in one embodiment a transparent pair of eyeglasses may be provided with polarization layers in the upper regions of the eyeglass lens or, alternatively, a conventional sunglass lens may be provided with polarization in the upper regions. In the latter case, the sunglass lens provides for the attenuation of various bands or colors of light even when viewing through this portion of the lens.

The result is that, by viewing the polarized instrumentation through the bottom portion of the sunglass lenses, one can readily read the display; and when viewing a scene at a distance beyond the instrumentation, one obtains all of the advantages of a polarized sunglass system.

This system is different from variable attenuation sunglasses, which change attenuation in response to a signal or in response to the brightness of the sun. In these instances, the entire sunglass lens has its attenuation changed or at least its density changed in response to some type of stimulus.

In summary, what is provided is a pair of sunglasses with the upper portion of the sunglass provided with polarization, whereas the lower portion of the sunglass is provided with no polarization such that viewing of polarized displays is permitted by viewing the polarized display through the unpolarized portion of the sunglass lenses.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
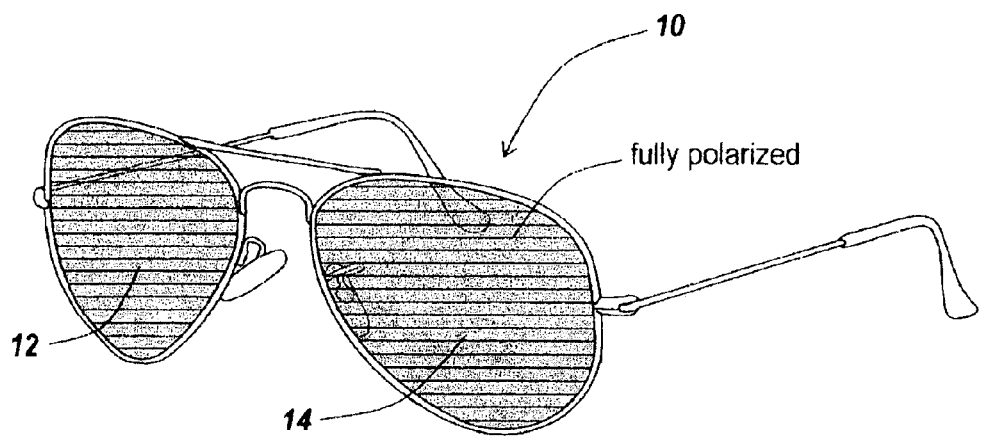
FIG. 1 is a diagrammatic illustration of fully polarized sunglasses in which polarization material is incorporated into each of the lenses for the eyeglasses.

Referring now to FIG. 1, a traditional pair of fully polarized sunglasses 10 is shown having lenses 12 and 14, which are either coated with polarizing material or have polarized material embedded therein. The result is that, while scenes at a distance will appear clearer and more distinct due to the use of fully polarized lenses, as will be discussed, when viewing instrumentation that has a polarized display, the display and the indicia on the display are completely blacked out due to cross-polarization.

Figure 2:
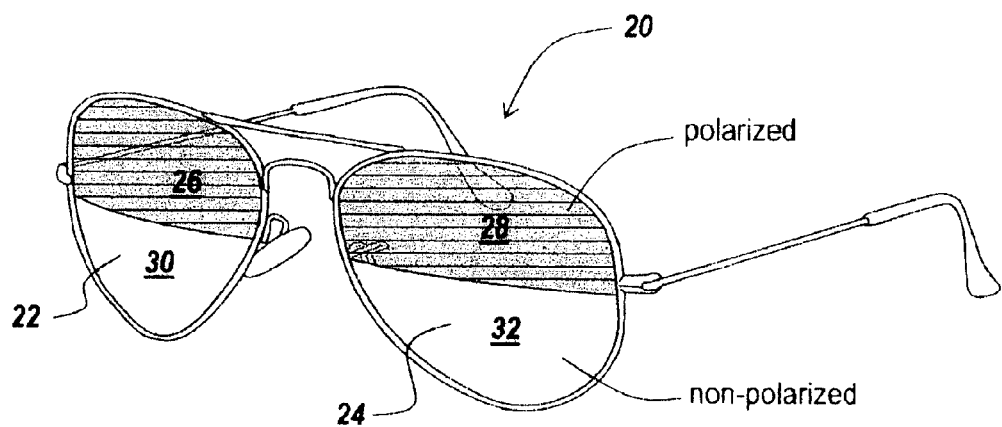
FIG. 2 is a diagrammatic illustration of a pair of sunglasses, the lenses of which have polarization material on the upper portion of the lens and a lower portion that is non-polarized.

Referring to FIG. 2, when sunglasses 20 are provided with lenses 22 and 24 having upper polarized regions 26 and 28 and having lower non-polarized regions 30 and 32, then as will be seen, while viewing objects at a distance in the viewed scene, one can obtain the beneficial results of polarized sunglasses, whereas by glancing down through the non-polarized portions one can readily view instrumentation with polarized displays.

The polarized and non-polarized portions may have the portion of the lens occupied thereby variable depending on the application. The only requirement of the subject invention is that at least portions of the partly polarized lenses of the subject invention have sufficient non-polarized area to permit viewing of polarized instrumentation without removal of the eyeglasses.

Moreover, the degree of polarization can be varied from maximum polarization at the top of the lenses to no polarization at the bottom of the lenses so as to obscure the demarcation between the polarized and no-polarized portions of the lenses.

Additionally, the non-polarized portion may occupy only a small area of the bottom portion of the lenses in much the same way as bifocals do, thus leaving the majority of the lenses polarized.

Moreover, any method of inducing polarization, such as by polarized film overlay, embedding of a polarized film, electro-optically-induced polarization, or the entraining of materials to induce polarization in the lenses, is within the scope of this invention.

Figure 3:
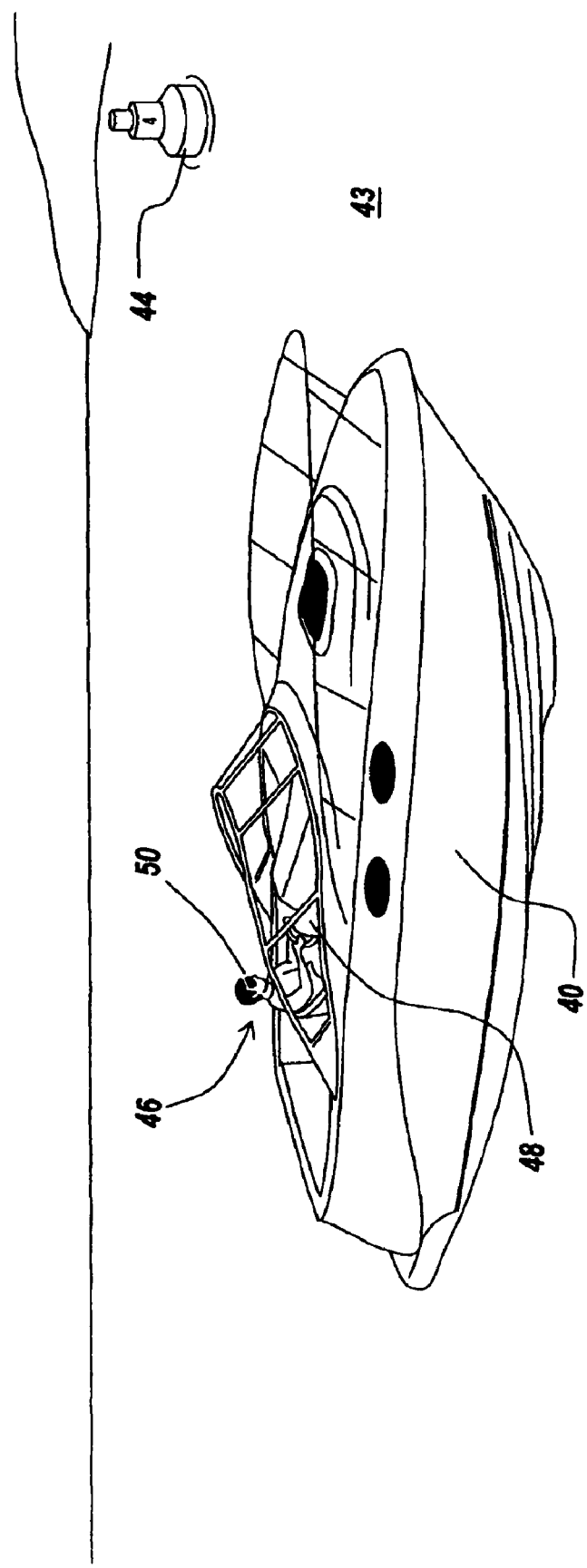
FIG. 3 is a diagrammatic illustration of an individual piloting a boat within a channel having a marker, the individual wearing fully polarized sunglasses.

Referring now to FIG. 3, what is shown is an application for such partially polarized sunglasses when boating. Here a boat 40 is shown entering a channel 42 with a marker 44. An individual 46 is seated in front of an instrument cluster 48, with individual 46 wearing sunglasses 50.

Figure 4:
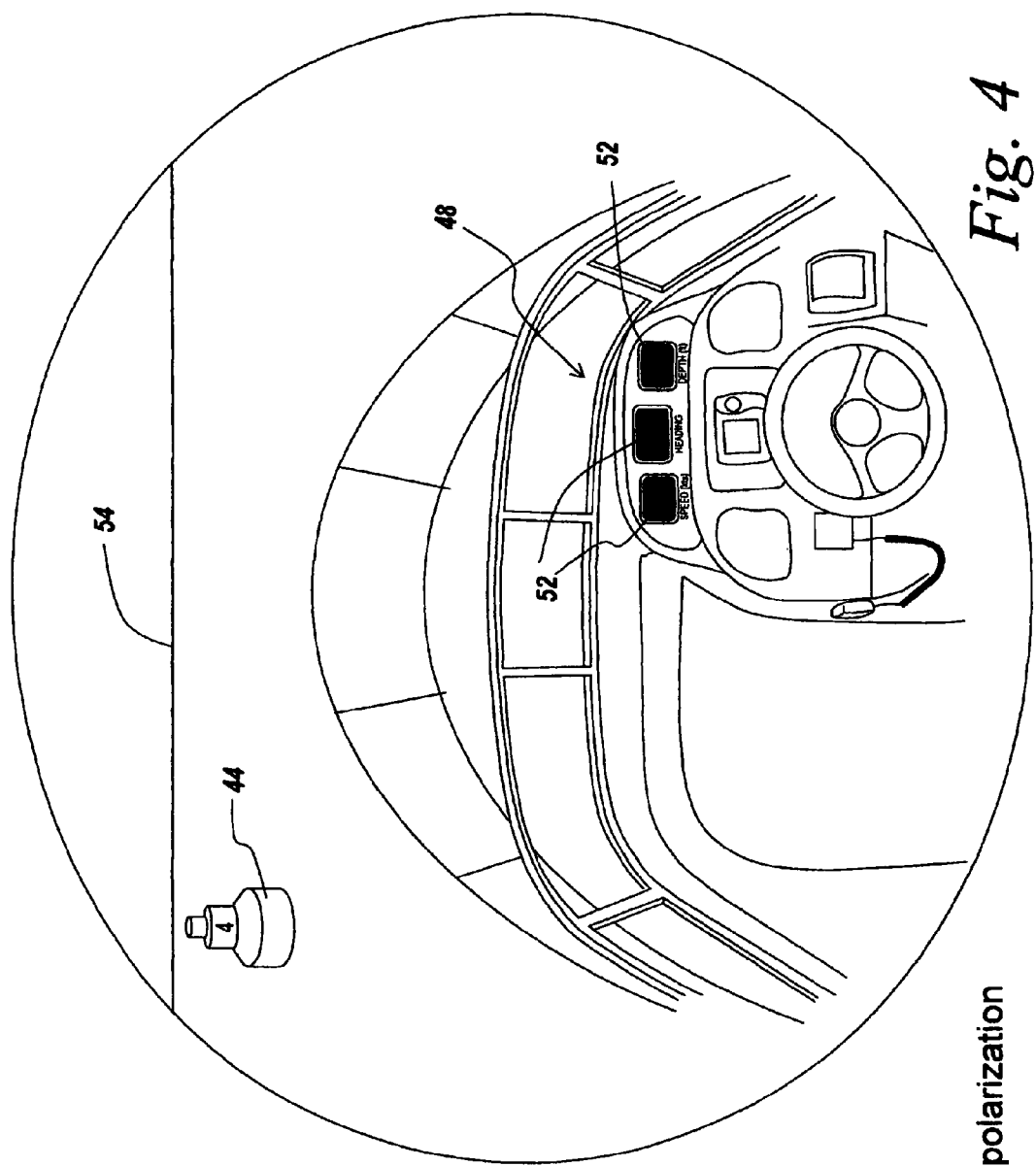
FIG. 4 is a diagrammatic illustration of the instrument cluster for the boat of FIG. 3, illustrating the result of cross-polarization in which the polarization direction of the sunglasses is perpendicular to that of the polarization used for the instruments, with the instruments having blackened faces as a result thereof.

Referring to FIG. 4, instrument panel 48 is shown to have a instrument cluster having polarized display instruments 52, which when viewed by individual 46 through fully polarized sunglasses 50 appear to be black. This is due to cross-polarization between the polarized lenses of the aforementioned sunglasses and the polarization associated with the instruments.

It will be noted that marker 44 and shoreline 54 are made clear to the wearer of the sunglasses due to the effect of polarization on rejecting polarized light.

However, the problem is simply that one wearing fully polarized sunglasses cannot see the indicia on certain types of instruments in an instrument cluster, making removal of the sunglasses necessary in order to obtain information from the instruments.

Not only is this true of marine instruments, which use super-twist liquid crystals and polarization coatings to make the indicia stand out on the instrument, but also fully polarized sunglasses may not be used by pilots either in commercial aircraft or civilian aircraft for the same reason. Thus as is common all sunglasses sold to pilots are of the non-polarized form and while they have coatings that reduce glare in some wavelengths to improve sharpness of the scene viewed, the use of polarization to improve image sharpness is avoided in aeronautical applications.

More importantly, some automotive dashboard instrumentation involves polarization-coated displays. These include LCD displays and others for which polarization techniques are used to improve visibility in the vehicle.

Needless to say, in all of the above applications polarized sunglasses are counter-indicated. Thus for any displays that are to be viewed using sunglasses, no matter the application, one must either remove one's polarized sunglasses when reading the displays or not be able to read the displays at all.

Figure 5:
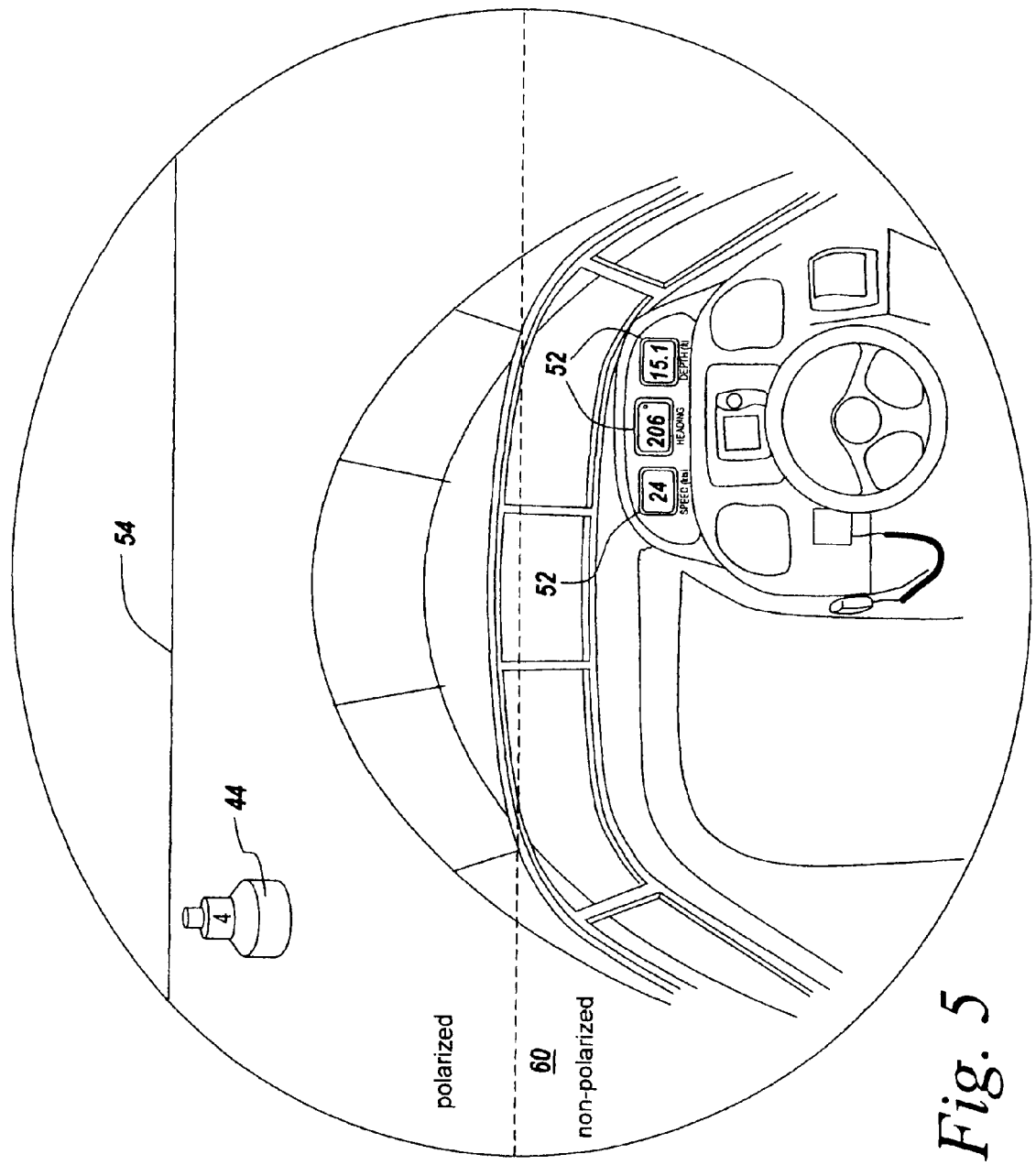
FIG. 5 is a diagrammatic illustration of the scene of FIG. 4 when viewing the scene with the partially polarized sunglasses of FIG. 2, illustrating a sharp scene for the polarized portion of the lenses and a clear view of the instrument panel in which the instrument indicia can be readily seen due to viewing the instrument panel through the non-polarized section of the sunglasses.

Referring to FIG. 5, when using the partially polarized sunglasses of FIG. 2, it can be seen that instruments 52 no longer have blackened faces but also have the alphanumeric indicia on the displays clearly visible due to the portion of the scene 60 viewed through the non-polarized portion of the sunglasses of FIG. 2. Note, however, that in the far-field, objects such as marker 44 and shoreline 54 are clear and distinct such that when one casts one's view to the horizon one can see objects clearly, whereas when one glances at the instrument panel one can clearly see the instrument displays.

Figure 6:
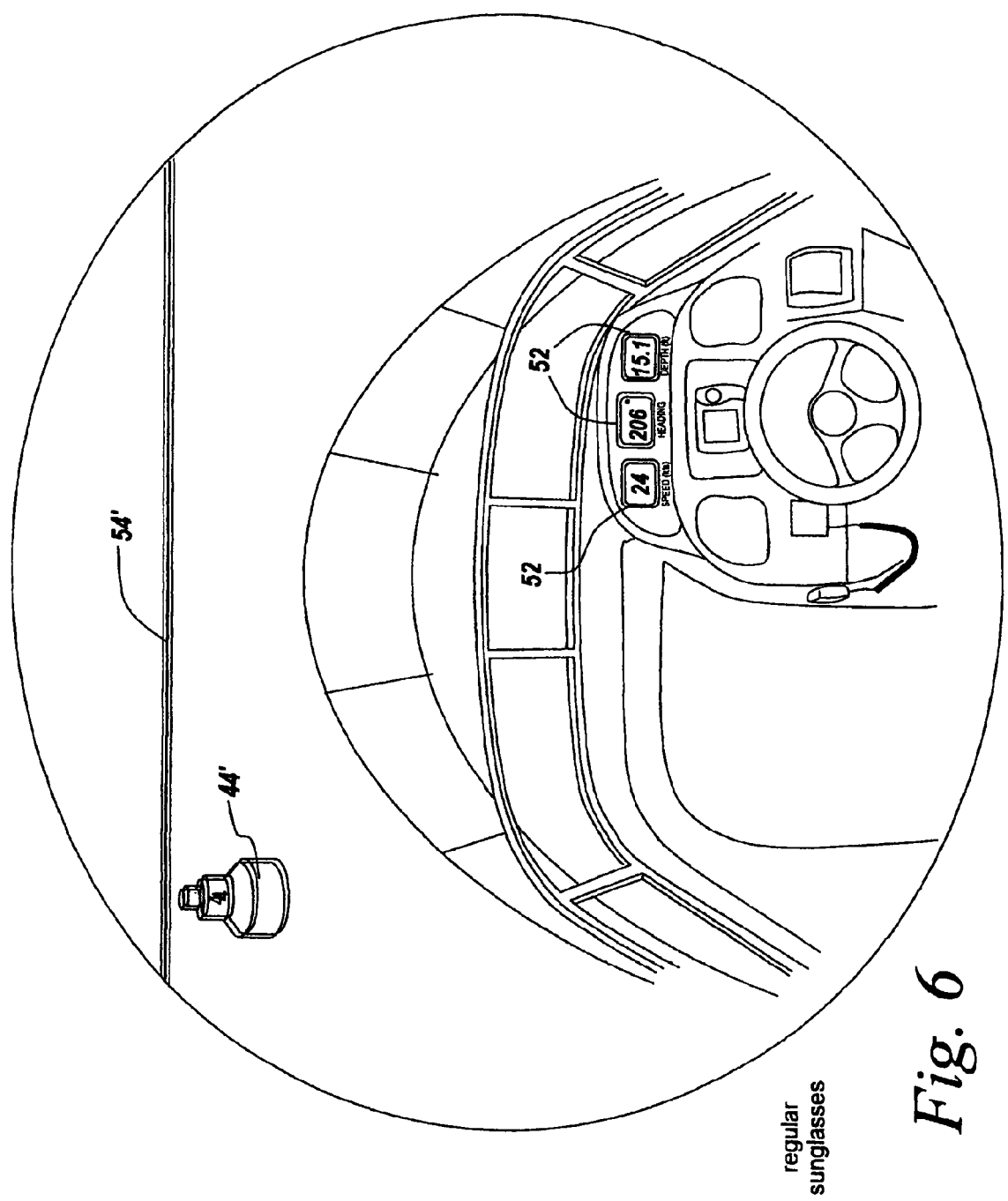
FIG. 6 is a diagrammatic illustration of the scene of FIG. 2 when viewed with regular non-polarized sunglasses, showing the lack of distinctness of the mark or buoy as well as the shoreline due to the failure to use polarized sunglasses.

Referring now to FIG. 6, it will be appreciated that instruments 52 may be viewed with regular non-polarized sunglasses, with the information presented by the instrument displays clearly visible.

However, as shown at 44', marker 44' is less distinct and less sharp than its counterpart in FIG. 5 due to the lack of polarization for regular sunglasses. The same is true for shoreline 54'.

Thus in order to obtain the proven advantages of polarized sunglasses for far-field viewing, the subject sunglasses perform the usual scene sharpening due to the upper portion of the lenses being polarized.

Moreover, without removing one's sunglasses and glancing down at a polarized instrument one can clearly view the indicia on the instrument through the non-polarized portion of the sunglasses, regardless of whether or not the non-polarized portions have other coatings normally used with regular sunglasses.

Figure 7:
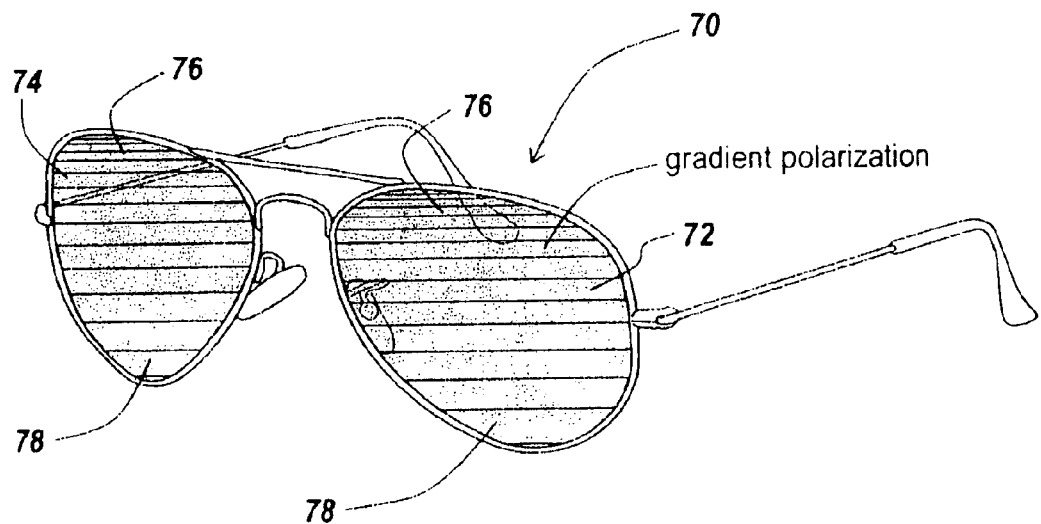
FIG. 7 is a diagrammatic illustration of partially polarized sunglasses indicating use of a polarization gradient ending in a lower area for the sunglass lenses in which there is no polarized material; and, FIG. 8 is a diagrammatic illustration of an embodiment of the subject invention in which the non-polarized portion of the sunglass lenses is in the form of a semicircular area at the bottom of each lens and in which the lenses may be prescription lenses, with the prescription for the semicircular region accommodating far-sighted individuals.

Referring now to FIG. 7, a pair of sunglasses 70 is provided with lenses 72 and 74, with each of the lenses having a gradient in the polarization applied to the lenses or carried on the lenses. It is noted that at the top of the lenses in region 76 there is maximum polarization, whereas region 78 at the lower portion of each lens is a non-polarized portion.

Gradient polarization may be accomplished in a number of ways, one of which being the stretching of polarization layers to provide the gradient. Another way is to provide adjacent stripes of polarization material of different polarization densities.

Figure 8:
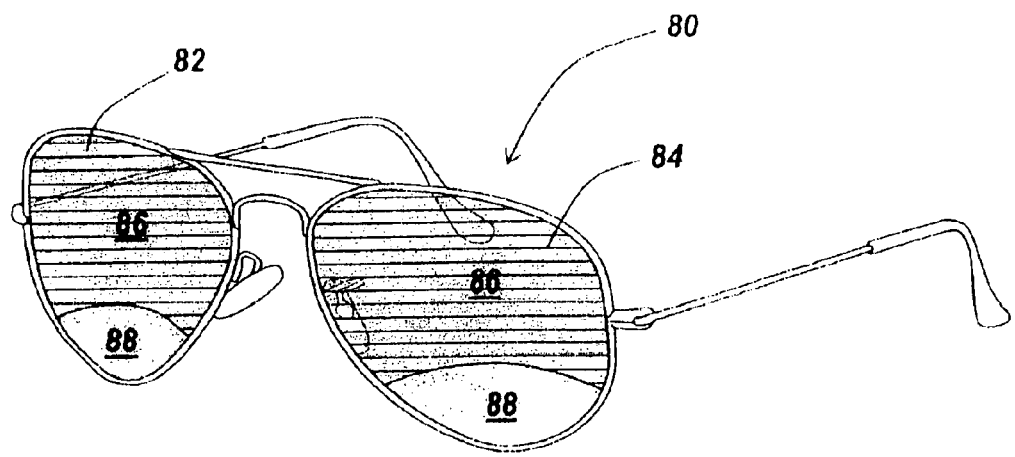

Referring now to FIG. 8, a pair of sunglasses 80 is provided with lenses 82 and 84 having regions 86 of polarized material and having semicircular regions 88 of non-polarized material such that for viewing polarized displays one would look through the U-shaped or semicircular non-polarized portions of the lenses.

In an alternate embodiment the lenses themselves may be prescription lenses, with region 88 providing a bifocal or trifocal lens strength. Thus, for instance, if sunglasses are provided primarily for long distance viewing with one prescription or no prescription, the semicircular regions may be provided with a different prescription, for instance to correct far-sightedness. The result is that the attenuation of polarized light in the far field is accomplished by viewing the scene through lens portions 86, whereas polarized display viewing is accomplished by viewing the polarized display through non-polarized portions 88 at the bottom of each lens.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for viewing a polarized display through sunglasses in which polarization is used to improve the viewing of far-field objects, comprising the step of:

viewing the display with sunglasses having lenses with an upper portion that is polarized and a lower portion that is non-polarized, such that glancing through the non-polarized portion provides a view of display indicia unattenuated by polarized material between the eye and the display, and further including the step of:

providing a difference in the degree of polarization between the top of the lenses to the bottom thereof, with a bottom portion of the lenses being substantially non-polarized.

2. The method of claim 1, wherein the sunglasses are formed by providing sunglasses with non-polarized lenses and overlaying a top portion of the non-polarized lenses of the sunglasses with polarized material.

3. The method of claim 1, wherein the lower non-polarized portion occupies a small semicircular region at the bottom of each lens.

4. The method of claim 1, wherein the step of viewing the display through the sunglasses includes an individual tilting one's head in an upward direction while wearing the sunglasses so as to view the display through the non-polarized portion thereof.

5. A method for viewing a display having a polarized layer through polarized sunglasses without having to remove the sunglasses to view the display that would otherwise appear black due to cross-polarization between the polarized sunglasses and the polarized display, comprising the steps of:

providing the polarized sunglass lenses with a lower non-polarized region;

viewing the display through the non-polarized region of the lenses, whereby the individual wearing the sunglasses obtains the benefit of viewing objects in the far field through polarized lenses and the benefit of being able to read a polarized display through the non-polarized region; and, providing the polarized sunglasses with differences in the degree of polarization from the top of the lenses to the bottom thereof, with a bottom region being substantially non-polarized.

6. The method of claim 5, wherein the sunglasses are formed by providing non-polarized sunglasses and overlaying a top portion of the lenses of the sunglasses with polarized material.

7. The method of claim 5, wherein the lower non-polarized region occupies a small semicircular region at the bottom of each lens.

8. The method of claim 5, wherein the step of viewing the display through the sunglasses includes an individual tilting his head in an upward direction while wearing the sunglasses so as to view the display through the non-polarized region thereof.

9. A pair of sunglasses for both viewing a far-field scene and a near-field instrument having a polarized display, comprising:

sunglasses having a pair of lenses, each of said lenses having a polarized upper portion and a non-polarized lower portion and an area of graded polarization therebetween, the graded polarization varying in the degree of polarization, whereby the polarized display may be viewed through the lower non-polarized portion without attenuation due to cross-polarization, said lenses including an upper region and a lower region and a non-polarized coating for attenuating selected wavelengths; and polarization material on each lens in the upper regions thereof to provide attenuation of polarized light from the far field due to the provision of said polarization material.

10. The sunglasses of claim 9, wherein the amount of polarization material provides a polarization gradient from maximum polarization to non-polarization portion from the top to bottom of each of said lenses.

11. The sunglasses of claim 9, wherein said lenses are clear and wherein said polarized upper portion includes an overlay of polarization material on said clear lenses.

12. The sunglasses of claim 9, wherein said lenses are initially provided with a non-polarized region for attenuating selected wavelengths, said lenses including polarization material on the upper portions of said lenses, whereby the upper portions of said lenses attenuate said selected wavelengths and polarized light, and wherein the non-polarized portions of said lenses attenuate said selected wavelengths but do not attenuate polarized light.

\* \* \* \* \*